(12) United States Patent
Moon et al.

(10) Patent No.: US 8,459,813 B2
(45) Date of Patent: Jun. 11, 2013

(54) LIGHT-EMITTING DEVICE OF PORTABLE COMMUNICATION TERMINAL

(75) Inventors: Tae-Hwa Moon, Daegu (KR); Joon-Young Lee, Gyeongsangbuk-do (KR); Kyoung-Jong Kim, Gwangju (KR); Jin-Woo Kim, Gyeongsangbuk-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 808 days.

(21) Appl. No.: 12/589,340

(22) Filed: Oct. 22, 2009

(65) Prior Publication Data

US 2010/0128494 A1    May 27, 2010

(30) Foreign Application Priority Data

Nov. 26, 2008    (KR) .................. 10-2008-0118293

(51) Int. Cl.
*G01D 11/28*    (2006.01)

(52) U.S. Cl.
USPC ......... 362/23.16; 362/23.09; 362/85; 362/88; 362/602; 362/632

(58) Field of Classification Search
USPC ............... 362/26, 27, 85, 88, 577, 602, 605, 362/23.06, 23.09, 23.1, 23.13, 23.16, 23.17, 362/632
See application file for complete search history.

(56) References Cited

U.S. PATENT DOCUMENTS

| | | | |
|---|---|---|---|
| 6,030,088 A | 2/2000 | Scheinberg | 362/85 |
| 6,626,552 B2* | 9/2003 | Uehara et al. | 362/85 |
| 2004/0203493 A1 | 10/2004 | Carlson | |

FOREIGN PATENT DOCUMENTS

| | | |
|---|---|---|
| CN | 201016466 | 2/2008 |
| EP | 1761002 A1 | 3/2007 |
| WO | WO 02/103504 A2 | 12/2002 |
| WO | WO 2006/098563 A1 | 9/2006 |

OTHER PUBLICATIONS

Dynatec Corp; "Non-Conductive Coating;" Jul. 3, 2007; XP002578857; <http://www.web.archive.org/web/20070703102454/http://dynatec-vp.com/english/prod/prod_file_dv/prod_file_dv.html> [retrieved from internet on Apr. 21, 2010].

* cited by examiner

*Primary Examiner* — Stephen F Husar
(74) *Attorney, Agent, or Firm* — Cha & Reiter, LLC

(57) ABSTRACT

A light-emitting device of a portable communication terminal improves exterior decoration by emitting light to the exterior of the portable communication terminal and implements a sense of unity of a design in a non-light emission state by integrating a portion to which the light is transmitted with a main body housing. The light-emitting device includes a housing, a light-emitting element for emitting light, a light guide sheet for guiding the light from the light-emitting element, and a light-transmitting portion integrally formed on the housing for transmitting the light from one end of the light guide sheet to an outer side of the housing. A sense of unity of the main body housing and the light-transmitting portion can be improved by applying a non-conductive vacuum metallizing (NCVM) process to the exterior. An aesthetic sense is improved with the sense of unity of the exterior design.

17 Claims, 7 Drawing Sheets

LIGHT-EMITTING DEVICE OF PORTABLE COMMUNICATION TERMINAL

CLAIM OF PRIORITY

This application claims the benefit under 35 U.S.C. §119(a) from a Korean Patent Application filed in the Korean Intellectual Property Office on Nov. 26, 2008 and assigned Serial No. 10-2008-0118293, the disclosures of which are incorporated herein by reference in its entirety.

BACKGROUND OF THE INVENTION

1. Field of the Invention

The present invention relates generally to a light-emitting device of a portable communication terminal. More particularly, the present invention relates to a light-emitting device of a portable communication terminal that can improve exterior decoration by emitting light to the exterior of the portable communication terminal and implement a sense of unity of a design and improve an aesthetic sense of an exterior design.

2. Description of the Related Art

Portable electronic devices, such as an MPEG audio layer-3 (MP3) player, a plasma display panel (PDP), a portable communication terminal, and a personal digital assistant (PDA) are being sold to the public in ever-increasing quantities. With the development of information communication technology, portable communication terminals are now being widely used, and various functions such as MP3 and game functions, as well as a camera function are now being provided in the portable communication terminals in ever-increasing numbers, due to increased consumer demand. In addition, various designs of portable communication terminals are being manufactured and sold to satisfy the demands of consumers. When portable communication terminals are selected for purchase/lease, the users typically weigh importance on the designs in addition to weighing the functionality of various portable communication terminals during the selection process. The emphasis on exterior design as well as functionality is of particular importance to consumers in the age range of 10 to 30 years old, such a group whose portable communication terminals have a short life cycle. One method for improving the design or appearance of the portable communication terminal is for the device to emit light to the exterior of the portable communication terminal.

FIG. 1 is a view illustrating a portable communication terminal including a light-emitting device being provided along a coupling line of front and rear cases of a main body housing so as to emit light to the exterior of a conventional portable communication terminal, and FIG. 2 is a view illustrating a state in which the light-emitting device of FIG. 1 is emitting light.

As illustrated in FIGS. 1 and 2, a light-emitting element (not shown) for emitting light is provided on an inner side of a main body housing 11 of a portable communication terminal 10 and a light-transmitting portion 12 for transmitting the light emitted from the light-emitting element is provided along a side surface of the main body housing 11. As illustrated in FIGS. 1 and 2, the light-transmitting portion 12 for transmitting light is a member separately mounted along the side surface of the main body housing 11. The light-transmitting portion 12 is made of a material capable of transmitting light and is clearly distinguished in appearance from the main body housing 11 when viewed from the exterior.

The light-transmitting portion 12 is coupled along the side surface of the main body housing 11 and may be viewed in a non-light emitting status by separately mounting the light-transmitting portion 12 onto the main body housing 11. Since the exterior design is not clean and the light-transmitting portion 12 is identified when viewed from the exterior of the main body housing 11, the heterogeneity is formed between the main body housing 11 and the light-transmitting portion 12 and a sense of unity of the exterior of the portable communication terminal 10 is degraded and hence an aesthetic sense is degraded. Since the light-transmitting portion 12 is separately mounted on the main body housing 11 and a process for coupling the light-transmitting portion 12 along a coupling line of the main body housing 11 is added to an assembly process of manufacturing the portable communication terminal, the assembly process is complex and the fabrication cost are increased as a result.

Accordingly, there is a long-felt need in the art for a light-emitting device of a portable communication terminal, which can cleanly make an exterior design by concealing a coupling line of a light-transmitting portion provided on a main body housing, particularly when viewed from outside of the main body housing and forming a sense of unity of the exterior of the portable communication terminal.

Also, a long-felt need exists for a light-emitting device of a portable communication terminal, which can improve an aesthetic sense by emitting light to an outer side of a main body housing.

SUMMARY OF THE INVENTION

An exemplary aspect of the present invention is to provide at least the advantages described below. Accordingly, one exemplary aspect of the present invention is to provide a light-emitting device of a portable communication terminal obscures the position of a light-diffusing portion when viewed from the outside in a non-light emission state by integrally forming the light-diffusing portion on a main body housing, so as to provide a clean exterior design of the portable communication terminal, and improve an aesthetic sense.

Another exemplary aspect of the present invention is to provide a light-emitting device of a portable communication terminal that can provide a clean exterior design in a non-light emission state by applying a Non-conductive Vacuum Metallization (NCVM) process to a light-diffusing portion to be integrally formed on a main body housing, and that can improve an exterior design and an aesthetic sense of the portable communication terminal by emitting light through the light-diffusing portion covered with an NCVM surface in a light emission state.

According to another exemplary aspect of the present invention, there is provided a light-emitting device of a portable communication terminal, including: a housing; a light-emitting element for emitting light; a light guide sheet for guiding the light from the light-emitting element; and a light-transmitting portion provided on the housing in an integral type, for transmitting the light from one end of the light guide sheet to an outer side of the housing.

According to yet another exemplary aspect of the present invention, there is provided a light-emitting device of a portable communication terminal, including: a housing; a light-emitting element for emitting light; a light guide sheet for guiding the light from the light-emitting element; a through portion, formed in the housing, through which the light from the light guide sheet passes; and a light-transmitting portion provided on the housing in an integral type, for transmitting the light from one end of the light guide sheet to an outer side of the housing through the through portion.

BRIEF DESCRIPTION OF THE DRAWINGS

The patent or application file contains at least one drawing executed in color. Copies of this patent or patent publication with color drawings will be provided by the Office upon request and payment of the necessary fee.

The above and other exemplary aspects, features and advantages of the LIGHT-EMITTING DEVICE OF A PORTABLE COMMUNICATION TERMINAL invention will become more apparent to a person of ordinary skill in the art from the following detailed description when taken in conjunction with the accompanying drawings in which.

Throughout the drawings, the same drawing reference numerals will be understood to refer to the same or similar elements, features and structures.

DETAILED DESCRIPTION

A first exemplary embodiment of the present invention will now be described in detail with reference to FIGS. 3 to 8.

Figure 4:
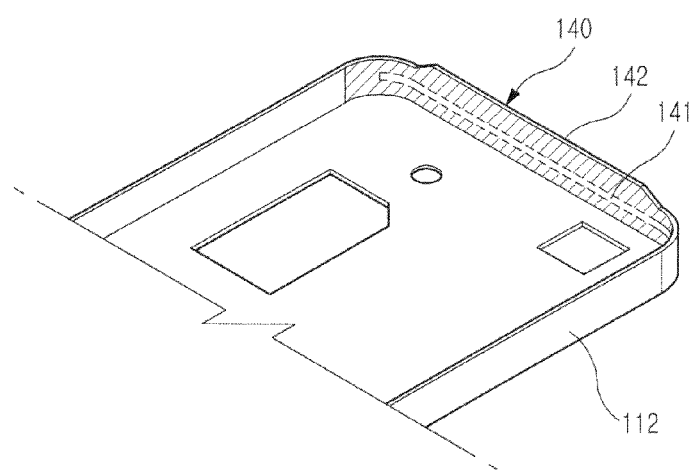
FIG. 4 is a partial perspective view illustrating a light-diffusing portion of the light-emitting device of the portable communication terminal according to the first exemplary embodiment of the present invention.
Figure 5:
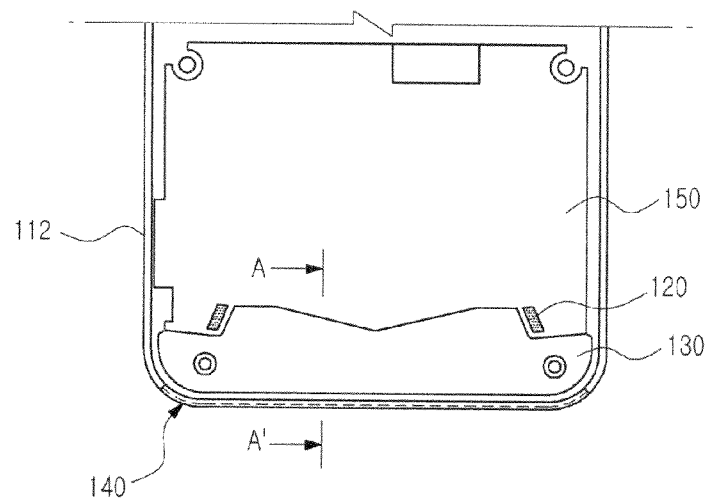
FIG. 5 is a view illustrating the light-emitting device of the portable communication terminal being coupled according to the first exemplary embodiment of the present invention.
Figure 6:
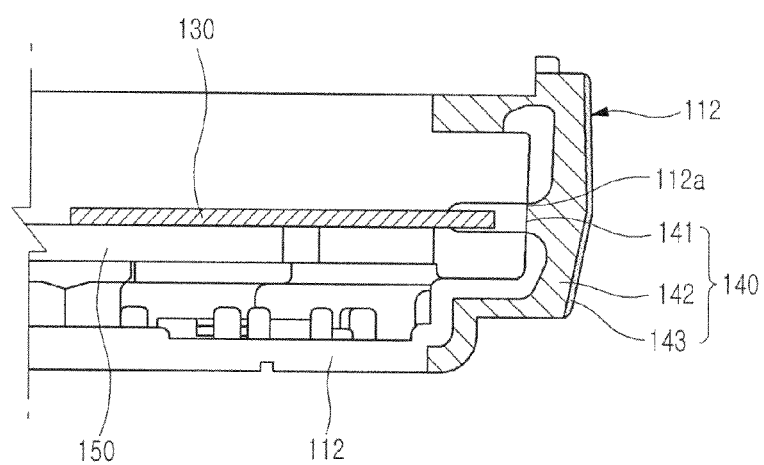
FIG. 6 is a cross-sectional view taken along line A-A' in FIG. 4.

As illustrated in FIGS. 3 to 6, a light-emitting device 100 of a portable communication terminal typically includes a housing 110, a light-emitting element 120 for emitting light, a light guide sheet 130 for guiding the light from the light-emitting element 120, and a light-transmitting portion 140. The light-transmitting portion 140 is integrally formed on the housing 110 and transmits the light from one end of the light guide sheet 130 to an outer side of the housing 110. As illustrated in FIG. 6, a through-hole 112a through which the light from the one end of the light guide sheet 130 passes is formed in the housing 110 and is covered with the light-transmitting portion 140. The through-hole 112a can be formed in a coupling surface direction of the housing 110 to one side surface thereof.

As illustrated in FIGS. 4 and 6, the light-transmitting portion 140 includes a light-diffusing portion 141 and an injection-molded portion 142. The light-diffusing portion 141 is preferably injection-molded onto the housing 110 integrally, so that the light is guided within the light guide sheet 130 and emitted to the outer side of the housing 110. The light-diffusing portion 141 engaged with the through-hole 112a passes through an inner/outer side of the housing 110 and is provided at a position facing the one end of the light guide sheet 130. The injection-molded portion 142 is injection-molded onto the housing 110 in the integral type and forms an outer surface of the housing 110 so that the light-diffusing portion 141 can diffuse the light from the light guide sheet 130.

Figure 1:
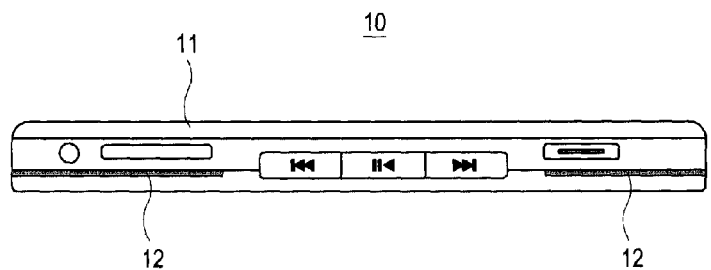
FIG. 1 is a view illustrating a off-state of a light-transmitting portion being provided along one side surface of a conventional portable communication terminal.
Figure 2:
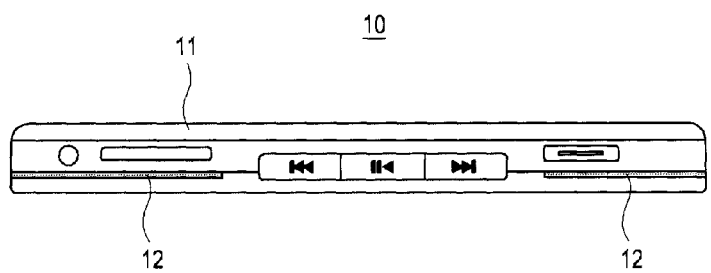
FIG. 2 is a view illustrating a on-state in which light is emitted from the light-transmitting portion provided along the one side surface of the conventional portable communication terminal.
Figure 3:
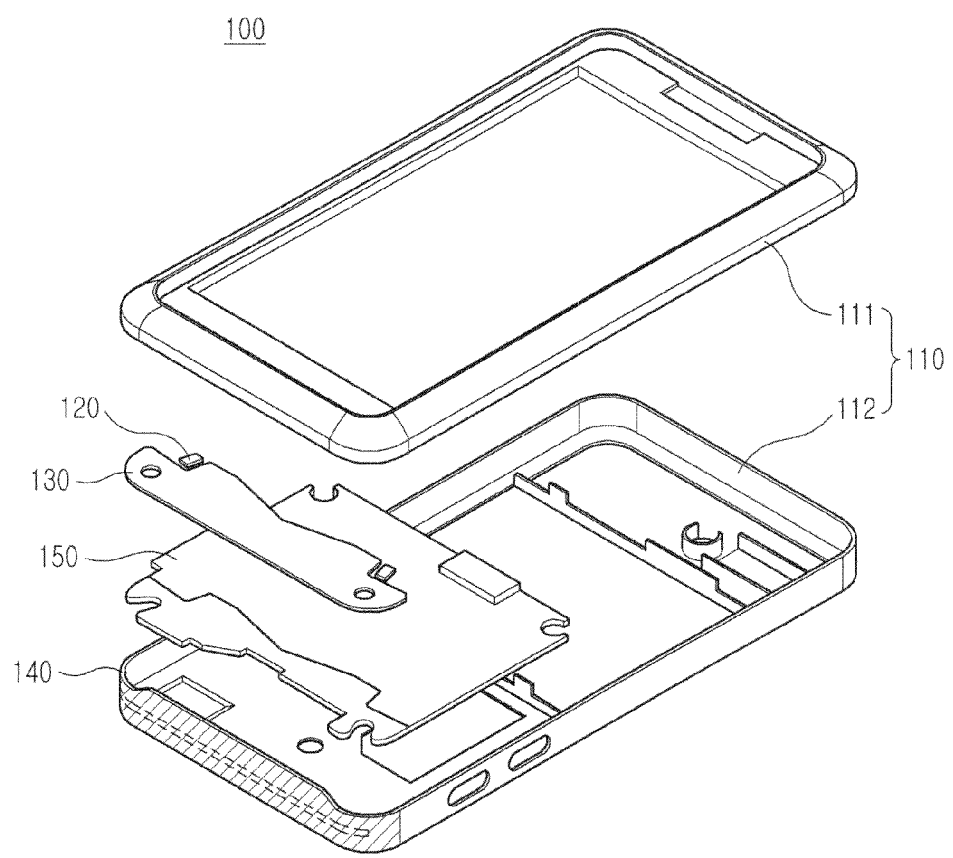
FIG. 3 is an exploded perspective view illustrating a light-emitting device of a portable communication terminal according to a first exemplary embodiment of the present invention.
Figure 7:
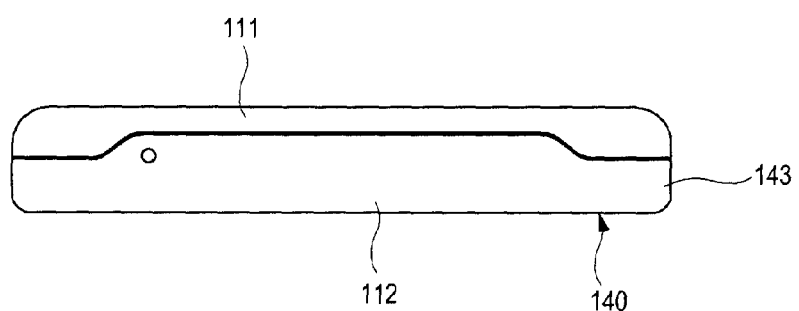
FIG. 7 is a view illustrating an operational state in which an NCVM process is applied to the light-emitting device of the portable communication terminal according to the first exemplary embodiment of the present invention.
Figure 8:
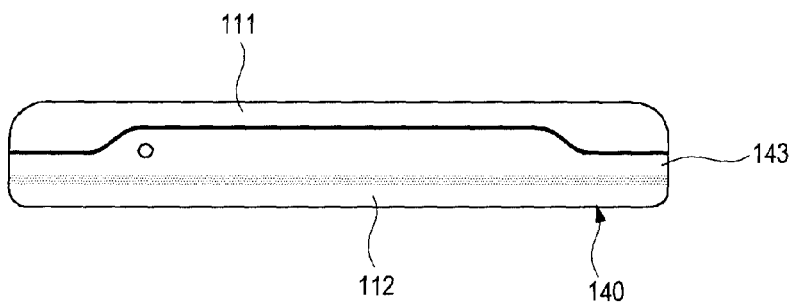
FIG. 8 is a view illustrating an operational state in which light is emitted through a light-diffusing portion in a state in which the NCVM process is applied to the light-emitting device of the portable communication terminal according to the first exemplary embodiment of the present invention.

As illustrated in FIGS. 3 to 8, the light-transmitting portion 140 is double injection-molded integrally onto the housing 110 and thus forms the outer surface of the housing 110. As illustrated in FIG. 6, the light-transmitting portion 140 is transparent or semi-transparent so that light emitted through the other end of the light guide sheet 130 can be transmitted through the outer side of the housing 110. As illustrated in FIGS. 7 and 8, a Non-conductive Vacuum Metallization (NCVM) process is applied to an outer side surface 143 of the light-transmitting portion 140 and the NCVM material used includes Cr, Sn, and Si. As illustrated in FIGS. 3, 5, and 6, the housing 110 includes a printed circuit board (PCB) 150 and the light guide sheet 130. The light-emitting element 120 for emitting light to the light guide sheet 130 is coupled at a position spaced from one end of the light guide sheet 130. The other end of the light guide sheet 130 is formed to face the light-diffusing portion 141 so that the light input through the one end thereof can be transmitted to the light-diffusing portion 141.

Referring to FIGS. 6, 7, and 8, the light emitted from the light-emitting element 120 can be input through the one end of the light guide sheet 130, guided inside the light guide sheet 130, and irradiated to the light-diffusing portion 141. As illustrated in FIG. 8, the light emitted through the other end of the light guide sheet 130 is emitted through the light-diffusing portion 141 and the outer side of the housing 110. Part of the light is input to the injection-molded portion 142 and diffused to the outer side of the housing 110.

Now referring to FIGS. 3 to 8, operation of the light-emitting device of the portable communication terminal having the above-described structure according to the first exemplary embodiment of the present invention will be described in detail. As illustrated in FIG. 3, the portable communication terminal includes one housing 110. The housing 110 is a combination of an upper case 111 and a lower case 112. The PCB 150 is provided between the upper case 111 and the lower case 112. At least one light-emitting element 120 serving as a light source is provided at an upper end of the PCB 150. The light guide sheet 130 for receiving the light from the light-emitting element 120 and outputting the light to the light-diffusing portion 141 is spaced from the light-emitting element 120 by a given length and mounted at the upper end of the PCB 150. At least one of the upper case 111 and the lower case 112 is double injection-molded to form integrally the light-transmitting portion 140 onto the lower case 112 of the housing 110 so that the light from the light-emitting element 120 can be transmitted and diffused. At the time the lower case is double injection molded, the through-hole 112a passing through the inner/outer side of the housing 110 is formed in the lower case 112. The through-hole 112a is engaged with the light-diffusing portion 141 of the light-transmitting portion 140 and provided at a position facing the other end of the light guide sheet 130 so as to emit light from the light guide sheet 130 to the outer side of the housing 110. As illustrated in FIGS. 3, 4, and 6, the light-transmitting portion 140 is integrated with the lower case 112, in particular, with one side surface of the lower case 112 in which the through-hole 112a is formed, through a double injection-molding process. The light-diffusing portion 141 is formed to face the other end of the light guide sheet 130 and transparently formed to pass through the inner/outer surface of the lower case 112 so that light guided by the light guide sheet 130 can be transmitted to the outer side of the lower case 112 through the light-diffusing portion 141. The injection-molded portion 142 is double injection-molded to overlap on one surface of the lower case 112. As illustrated in FIGS. 5 and 6, a thickness of the injection-molded portion 142 is substantially the same as that of the side surface of the lower case 112. The inner side of the injection-molded portion 142 is formed as the lower case 112 and the outer side thereof is integrated to form a double structure. Light from the light guide sheet 130 is transmitted only through the light-diffusing portion 141 and the injection-molded portion 142 absorbs and diffuses part of the transmitted light through the light-diffusing portion 141. As illustrated in FIGS. 7 and 8, the clean and quality exterior of the light-transmitting portion 140 can be implemented by depositing a material such as Cr, Sn, or Si on the outer side surface 143 of the light-transmitting portion 140 in the NCVM process. In this operational state, when the light-emitting element 120 emits light, the light is input and guided within the light guide sheet 130 and illuminated to the light-diffusing portion 141 through the other end of the light guide sheet 130 facing the light-diffusing portion 141. The light from the light guide sheet 130 is diffused by the light-diffusing portion 141 and emitted to the outer side of the lower case 112. This light is the blue light shown in FIG. 8.

Part of the blue light from the light-diffusing portion 141 can be input to the injection-molded portion 142, so that the light is emitted to the outer side of the lower case 112 through the injection-molded portion 142. Accordingly, in the light emission state, the quality light emission is possible due to the NCVM process applied to the outer side surface 143 of the light-transmitting portion 140.

Since the light-transmitting portion 140 is fabricated in the integral type when the housing 110 is fabricated, the light-emitting device 100 of the portable communication terminal can be implemented without specially installing a device for transmitting light. Since a special member for transmitting light to the outer side of the housing 110 does not need to be provided in an assembly process, the assembly process can be simplified and the assembly cost can be lowered. Since the light-transmitting portion 140 is formed on the housing 110 in the integral type, the exterior can be cleanly processed and the quality exterior design can be implemented through the NCVM process.

Now referring to FIGS. 9 to 11, The operation of a light-emitting device of a portable communication terminal according to a second exemplary embodiment of the present invention will now be described in detail. Here, the same reference numerals represent the same elements between the first exemplary embodiment and the second exemplary embodiment and their detailed description will be omitted.

Figure 9:
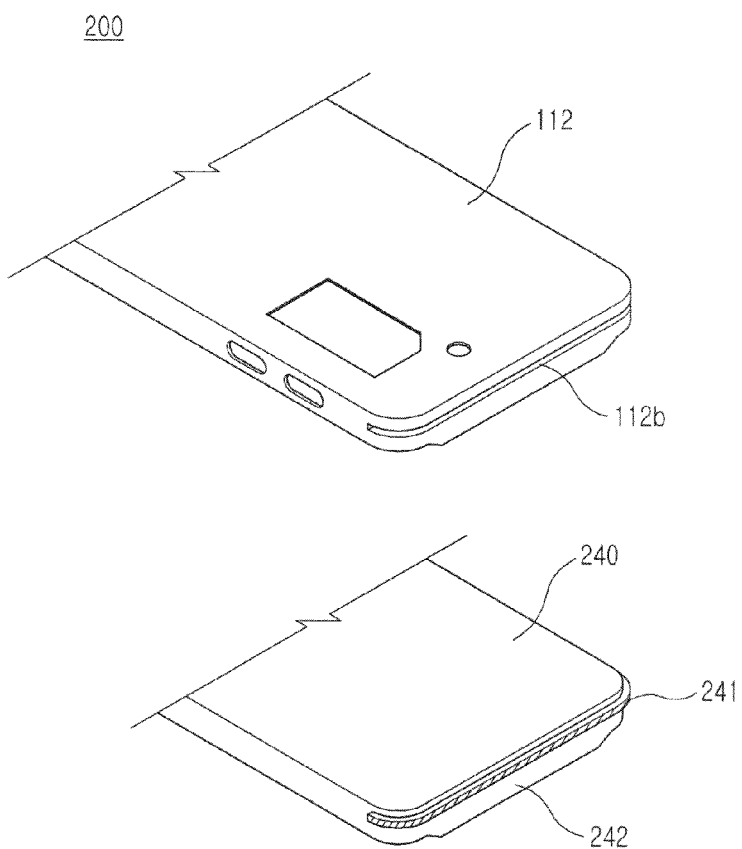
FIG. 9 is a view illustrating a light-emitting device of a portable communication terminal according to a second exemplary embodiment of the present invention.
Figure 10:
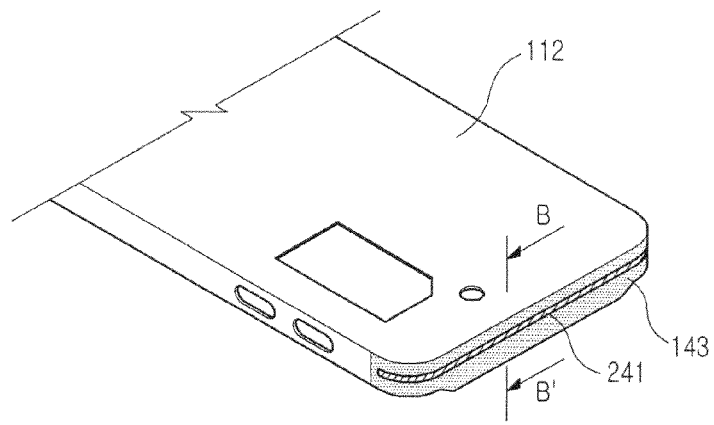
FIG. 10 is a view illustrating a light-transmitting portion that was double injection-molded onto an inner side surface of a housing in an integral type in the light-emitting device of the portable communication terminal according to the second exemplary embodiment of the present invention.
Figure 11:
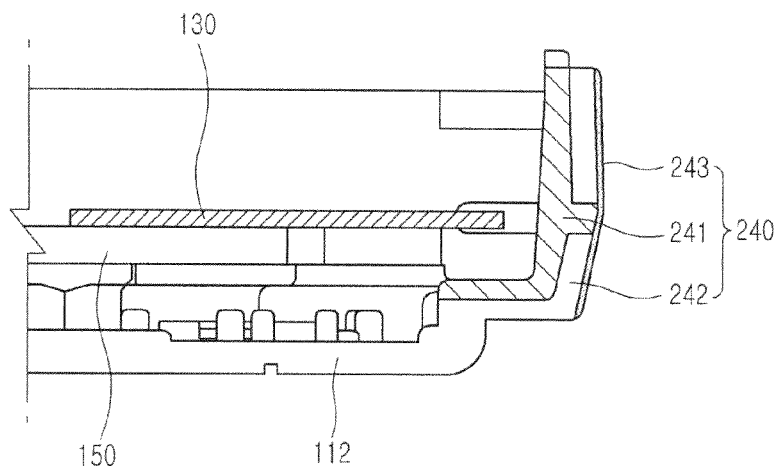
FIG. 11 is a cross-sectional view taken along line B-B' in FIG. 10.

As illustrated in FIGS. 9 to 11, the light-emitting device of the portable communication terminal according to the second exemplary embodiment of the present invention includes a housing 110 having a lower case 112 shown in FIG. 9, a light-emitting element 120 provided inside the housing 110, for emitting light to an outer side of the housing 110, a light guide sheet 130 (FIG. 11) *for* guiding the light emitted from the light-emitting element 120, a through-portion 112a (FIG. 9), and a light-transmitting portion 240. As in the first exemplary embodiment, the housing 110 includes an upper case 111 and a lower case 112. The light-transmitting portion 240 can be double injection-molded onto at least one case of the upper case 111 and the lower case 112 in an integral construction. The light-transmitting portion 240 is provided on the lower case 112 as in the first exemplary embodiment.

As illustrated in FIG. 9, the through-portion 112b is formed in the housing 110 (or the lower case 112) so that the light from the light guide sheet 130 passes through the through portion 112a. The light-transmitting portion 240 is provided on the lower case 112 in the integral type so that the light from one end of the light guide sheet 130 can be transmitted to the outer side of the lower case 112 through the through-portion 112b. As illustrated in FIG. 9, the through-portion 112b is made of a through hole. As illustrated in FIG. 10, the light-transmitting portion 240 is double injection-molded onto an inner side surface of the lower case 112 in the integral type.

A difference between the first exemplary embodiment and the second exemplary embodiment of the present invention is the light-transmitting portion 240 of the second exemplary embodiment is used in lieu of light-transmitting portion 140 of the first exemplary embodiment, and this difference is discussed herein below.

For example, according to the first exemplary embodiment, the light-transmitting portion 140 is double injection-molded onto the outer side surface of the lower case 112 in the integral type. Thus, the light-diffusing portion 141 is attached from the outer side surface of the lower case 112 to the through-hole 112a in an inner side direction and double injection-molded.

However, on the other hand, according to the second exemplary embodiment, the light-transmitting portion 240 is double injection-molded onto the inner side surface of the lower case 112 in the integral type. Thus, a light-passing portion 241 is attached from the inner side surface of the lower case 112 to the through-portion 112b in an outer side direction, and double injection-molded. As illustrated in FIG. 9, the light-transmitting portion 240 includes the light-passing portion 241 and an injection-molded portion 242. The light-passing portion 241 passing through the inner/outer side of the lower case 112 is engaged with the through-portion 112b. The injection-molded portion 242 is injection-molded onto the inner side surface of the lower case 112 at the center of the light-passing portion 241 in the integral type.

As illustrated in FIG. 10, the light-passing portion 241 is transparent or semi-transparent so that light emitted to the other end of the light guide sheet 130 can be transmitted.

As illustrated in FIG. 11, an NCVM surface 243 is formed on the lower case 112. Specifically, the NCVM surface 243 is formed on one side surface of the lower case 112 at the center of the light-passing portion 241, thereby forming an outer side surface of the lower case 112. An NCVM material coated on the NCVM surface 243 is made of Cr, Sn, or Si to have a metallic feeling, thereby improving an aesthetic sense of the exterior of the lower case 112. Accordingly, light emitted from the light-emitting element 120 is input and guided within the light guide sheet 130 and emitted to the through-portion 112b. The light from the light guide sheet 130 passes through the transparent light-transmitting portion 240 formed in the through-portion 112*b* and the NCVM surface 243 and is emitted to the outer side of the lower case 112.

As is apparent from the foregoing description, a light-emitting device of a portable communication terminal according to the exemplary embodiments of the present invention presented herein can provide a light-transmitting portion at a desired position of a main body housing in an integral type using a double injection-molding process when the main body housing is fabricated. A sense of unity of an exterior design and an aesthetic sense can be improved by applying an NCVM process to an outer surface of the main body housing and the light-diffusing portion formed in the integral type. The decoration of the portable communication terminal can be improved while light is emitted from a light-emitting element through a light-diffusing portion formed on the exterior of the portable communication terminal in the integral type. Portable communication terminals suitable for preferences or demands of users can be provided by forming the light-diffusing portion at a desired position and promoting a sense of unity when the main body housing is fabricated.

While the invention has been shown and described with reference to a certain preferred embodiments thereof, it will be understood by those skilled in the art that various changes in form and details may be made therein without departing from the spirit and scope of the invention as defined by the appended claims. For example, an example in which a light-diffusing portion and a light-passing portion are provided on a lower side surface of a lower case has been illustrated. Alternatively, the light-diffusing portion and the light-passing portion may be provided on both side surfaces of the lower case or along an outer line of a display provided on an upper case so that light can be emitted.

What is claimed is:

1. A light-emitting device of a portable communication terminal, comprising:
    a housing;
    a light-emitting element for emitting light arranged within the housing;
    a light guide sheet arranged within the housing for receiving and guiding the light from the light-emitting element; and
    a light-transmitting portion provided integrally as part of the housing, for transmitting the light from one end of the light guide sheet to an outer side of the housing wherein the light-transmitting portion includes a light-diffusing portion for diffusing the light guided by the light guide sheet.

2. The light-emitting device of claim 1, wherein the light transmitting portion further comprises a through-portion formed in the housing, through which the light passes from the light guide sheet to the outer side of the housing.

3. The light-emitting device of claim 2, wherein the through-portion comprises a through-hole, and the light-transmitting portion is integrally formed with the housing by being double injection-molded onto an inner side surface of the housing.

4. The light-emitting device of claim 3, wherein the light-transmitting portion includes:
    a light-passing portion engaged with the through-hole and passing through at least one of inner and outer sides of the housing; and
    a portion injection-molded onto an inner side surface of the housing at a center of the light-passing portion in the integral type.

5. The light-emitting device of claim 4, wherein the light-passing portion is at least semi-transparent to transmit the light emitted to the other end of the light guide sheet.

6. The light-emitting device of claim 4, wherein a non-conductive vacuum metallizing (NCVM) surface is formed on one side surface of the housing at a center of the light-passing portion.

7. The light-emitting device of claim 6, wherein an NCVM material coated on the NCVM surface comprises at least one of Cr, Sn, and Si.

8. The light-emitting device of claim 6, wherein the light emitted from the light-emitting element is guided within the light guide sheet and emitted to the through-hole, and the light from the light guide sheet passes through the NCVM surface and is emitted to the outer side of the housing.

9. The light-emitting device of claim 1, wherein a through-hole through which the light passes from the one end of the light guide sheet is covered with the light-transmitting portion and formed in the housing.

10. The light-emitting device of claim 9, wherein the light-transmitting portion includes:
    a light-diffusing portion for diffusing the light guided by the light guide sheet, the light-diffusing portion is integrally formed with the housing by being injection-molded onto the housing and engaged with the through hole so as to pass through at least one of inner and outer sides of the housing, and provided at a position facing the one end of the light guide sheet; and
    a portion injection-molded onto the housing and forming an outer surface of the housing.

11. The light-emitting device of claim 10, wherein the light-transmitting portion integrally formed with the housing by being double injection-molded onto the housing and forming an outer surface of the housing.

12. The light-emitting device of claim 9, wherein the light-transmitting portion is at least semi-transparent to transmit the light from the other end of the light guide sheet to the outer side of the housing.

13. The light-emitting device of claim 12, wherein a non-conductive vacuum metallizing (NCVM) material is deposited on an outer side surface of the light-transmitting portion.

14. The light-emitting device of claim 13, wherein the NCVM material includes at least one of Cr, Sn, and Si.

15. The light-emitting device of claim 14, wherein a printed circuit board (PCB) is provided in the housing, the light guide sheet is provided at an upper end of the PCB, the light-emitting element is provided at a position spaced from the one end of the light guide sheet, the other end of the light guide sheet is formed to face the through-hole, the light emitted from the light-emitting element is guided within the light guide sheet and emitted to the through-hole, and the light-diffusing portion being double injection-molded diffuses the light to the outer side of the housing through the through-hole.

16. The light-emitting device of claim 15, wherein the light emitted through the other end of the light guide sheet is emitted to the outer side of the housing through the light-diffusing portion, and part of the light is input to the injection-molded portion and diffused to the outer side of the housing.

17. A light-emitting device of a portable communication terminal, comprising:
    a light-transmitting portion integrally formed as part of a housing of the portable communication terminal for transmitting light from a light-emitting element to an outer side of the housing, wherein the light-transmitting portion includes a light-diffusing portion for diffusing the light guided by the light guide sheet in which the outer side being coated by a non-conductive vacuum metallizing (NCVM) process.

\* \* \* \* \*